Sept. 9, 1947.  H. C. DREISCHERF  2,427,265
ROTARY HEDGE TRIMMER
Filed Dec. 3, 1943
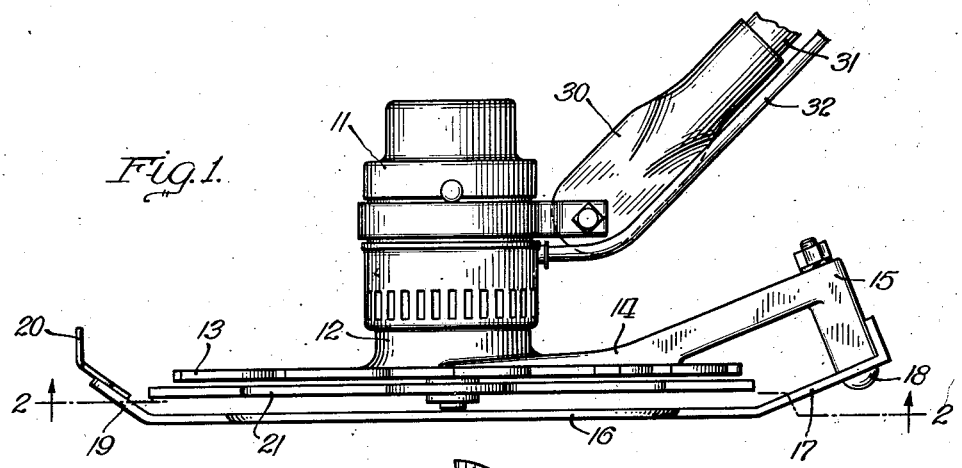
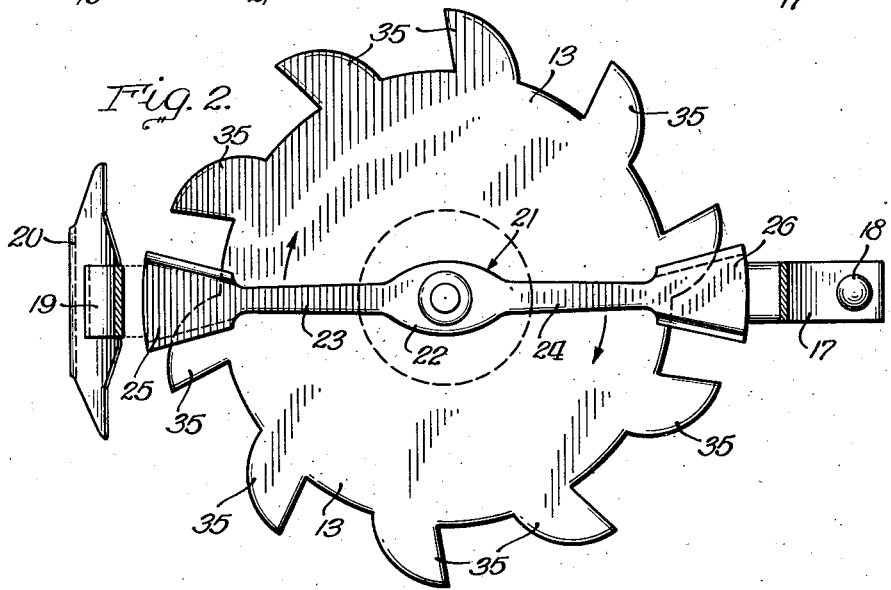
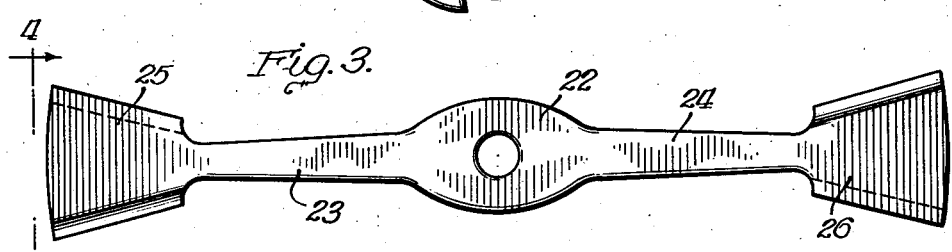
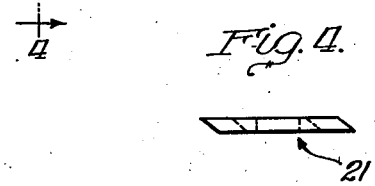
INVENTOR.
Henry C. Dreischerf
BY
George A. Quer
Attys.

Patented Sept. 9, 1947

2,427,265

UNITED STATES PATENT OFFICE 2,427,265

ROTARY HEDGE TRIMMER

Henry C. Dreischerf, Chicago, Ill.

Application December 3, 1943, Serial No. 512,815

7 Claims. (Cl. 30—206)

1

This invention relates to rotary hedge trimmers, and is particularly concerned with improvements in the cutting blade and cutting guide used in such trimmers.

Among the specific objects of the invention are the following: (1) the provision of a new lightweight cutting blade carrying enlargements at either end which constitute relatively large cutting masses capable of developing a maximum momentum, thereby producing more efficient operation; (2) the provision of cutting edges which render greater possibilities for sharpening, thereby contributing to better utilization of the blade and to increased life thereof; and (3) the provision of a guide carrying peripherally disposed projections disposed at an improved angle with respect to the angle of the cutting edges of the blade, whereby shrubbbery to be trimmed, that is, its twigs, leaves, etc., are gathered and positioned radially inwardly under the impact of the blade at a more favorable angle of approach, thereby rendering more efficient work and resulting in neater trimming than is possible with prior apparatus of this type.

These and other objects of the invention will be brought out in detail in the description which is rendered below with reference to the drawings. In these drawings, Fig. 1 shows an embodiment of a hedge trimmer of the kind in which the invention may be used;

Fig. 2 is a view of the trimmer along lines 2—2 in Fig. 1, showing an embodiment of the new cutting blade and the guide coacting therewith; and Figs. 3 and 4 are enlarged views of the new cutting blade.

The trimmer shown in Fig. 1 is of the small type having a guide diameter of less than twelve inches, and a blade which is operated by a motor having a fraction of a horsepower, e. g., $\frac{1}{32}$ horsepower. Prior trimmers of such general structure frequently stop in operation, apparently because the motor cannot overcome the brake forces presented by the cutting load. They have to be retracted from position in the shrubbery after each stoppage so as to permit the motor to rotate the blade again. Such stop-start operation wastes time, is irritating to the operator, damaging to the mechanism, and results in uneven cutting and generally wasteful and inefficient operation. The invention avoids these and other drawbacks in a manner pointed out below, first with reference to Fig. 1.

Numeral 11 indicates a small electric motor

2 mounted on the tubular neck 12 which carries a generally circular guide plate 13 and a radially rearwardly projecting arm 14. The later is provided with an angular extension 15 to which is attached the bottom guard plate 16 by means of an arm 17 secured by a bolt 18 on the extension 15. Another arm 19 projects from the plate 16 at the forward end thereof and carries a laterally disposed blade guard 20 which is usually referred to as "finger guard." This latter guard prevents edgewise contact of the rotating blade with objects adjacent the hedge to be trimmed, e. g., walls and fences. The bottom guard plate 16 keeps the cutting blade a desired distance above the base of the cutting plane, e. g., the ground, and protects it against damage from and interference with objects at the bottom. The motor shaft projects through the guide plate 13 and carries the cutting blade 21. Numeral 30 indicates a shell attached to the structure by a suitable clamp and holding a rearwardly projecting handle 31. Numeral 32 indicates the cord for the electric motor.

The cutting blade of prior trimmers of this type is usually made of suitable flat sheet material and shaped with the longitudinal edges nearly in parallel. One side at each end of the blade is usually cut or ground at an angle to the plane of the blade body to form a cutting edge. There are thus only two cutting edges, one at either end of the blade, and the blade is therefore always used so as to rotate in the same direction. Dulling of the cutting edges requires stopping of the operation and sharpening of the blade before the operation can be resumed. The life of such orthodox cutting blade is short because the relatively narrow masses at its ends are quickly ground off by the sharpening that is from time to time required. The structure of such a cutting blade as made heretofore presents a relatively heavy mass in and toward the center, requiring operating torque of the small motor which is under certain conditions too great for its rating. Hence the frequent stopping of operation, as previously mentioned.

The guide plate usually found in prior structures is provided with peripheral circumferentially spaced cutouts forming peripherally disposed teeth or projections which extend either in parallel with one another, in the form of a grid, or at an angle which intersects the axis of the apparatus. The angle of the guide plate projections is not disposed in old devices with a view toward facilitating the cutting operation in coaction with the rotating cutting blade.

The new blade structure and the structure of the new guide plate, as well as coaction of these elements, are best described by referring to Figs. 2–4, inclusive.

The new blade is made of flat steel sheet of suitable thickness and quality, cut, machined or stamped therefrom (cast blades may be employed), and comprises a central mounting section 22, outwardly slightly tapering relatively light arms 23—24 extending radially outwardly from the central mounting section, and enlargements 25—26, one at each end of the arms 23—24, which constitute the cutting masses of the structure. The result is a relatively lightweight blade requiring small torque for operation and disposing large masses at opposite ends which develop relatively great momentum exactly where the force of such momentum is needed and where it can enhance the operation, namely, at the points where the actual cutting takes place and where brake forces are applied by contact with the shrubbery, grass or the like, which is to be trimmed.

Each enlargement is shaped in the form of a segment. The sides of each segment are cut radially inwardly with the lines thereof, when radially inwardly projected, intersecting about midway of the corresponding arms 23—24 thus forming a mass at each end of the blade which is shaped like the frustum of a cone, with the base projecting outwardly and the small end merging with the inwardly extending arm. The edges of these enlargements are cut or ground at an angle to the general plane of the blade body forming at each end of the blade a pair of oppositely disposed inwardly tapering cutting edges, one on each side of the corresponding enlargement.

The top guide plate 13 is made of suitable sheet material, generally circular in shape, and provided with a number of peripherally disposed teeth or projections 35. Each projection or tooth is provided with a straight edge disposed so as to form, in coaction with the cutting edge of the blade incident to the rotation thereof, an acute radially inwardly widening angle. The far side of each projection, viewed in the direction of rotation of the cutting blade, forms a curved edge adapted to guide shrubbery and the like into the circumferential spaces between adjacent projections.

In operation, the objects to be trimmed, e. g., leaves and twigs, enter the circumferential spaces between the teeth or projections 35. The blade rotates, driven by the motor 11, and as the angularly disposed inwardly tapering cutting edges sweep across the spaces between the projections they cut the leaves and the like, trimming the hedge as desired. The momentum developed by the blade due to the cutting masses at its opposite ends facilitates the operation by adding the force of these masses to the rotation imparted by the motor. The possibility for stopping is therefore greatly diminished and is in normal operation eliminated.

The manner in which the cutting edges are disposed on the blade provides a more favorable angle of approach for cutting, and the manner in which the straight edges of the teeth or projections on the guide plate are disposed furnishes a more favorable angle for holding and nestling the leaves and the like for the cutting operation of the blade. The resulting coaction between the inwardly tapering cutting edges of the blade and the inwardly angularly extending straight edges of the guide projections tends to move the leaves to be trimmed radially inwardly to position them for efficient cutting. The cutting approach of the cutting edges is not perpendicular to the objects to be cut, but tangential thereto, reducing impact forces and increasing true cutting and slicing forces which are more efficient for the intended purpose.

The provision of two cutting edges at each end of the blade furnishes greater operating and sharpening possibilities. In case of dulling of the two cutting edges which are initially active (assuming that a newly sharpened blade is being used), all that is necessary is to turn the blade around so as to utilize the two remaining sharp cutting edges. Trimming can then proceed. The effective operation time, as compared with old blades provided with only two cutting edges, one at each end thereof, is thus doubled.

The relatively large masses at the outer ends of the new blade increase the life thereof because they furnish more material for sharpening.

Changes may be made within the scope and spirit of the following claims in which I have defined what I consider new and desire to have protected by Letters Patent of the United States.

I claim:

1. A blade made of generally flat material for use in a rotary hedge trimmer of the class described, which includes a motor and a shaft rotated thereby, said blade comprising a central mounting section for suitable attachment to the shaft of said motor, radially outwardly projecting arms each of outwardly diminishing width extending from said mounting section, an enlargement carried by each of said arms at the outer end thereof and forming a mass thereat of radially outwardly increasing width, the sides of each of said enlargements being beveled at an angle to the plane of the body of said blade to form a reversible blade with a pair of oppositely disposed inwardly converging cutting edges, said enlargements forming masses at the outer ends of said arms which increase the momentum of the blade responsive to rotation thereof for the purpose of increasing the cutting force thereof.

2. A relatively lightweight cutting blade made of generally flat material for use in a rotary hedge trimmer of the class described, which includes a motor driven shaft, the masses of said blade being distributed in such a manner as to combine great strength and cutting force with small total weight, the blade comprising a central mounting section for suitable attachment to said motor driven shaft, radially outwardly projecting arms extending from said mounting section, the width of said arms diminishing radially symmetrically outwardly for the purpose of diminishing the total weight of the blade and the torque required for the rotation thereof, and an enlargement at the outer end of each of said arms forming a mass thereat of radially outwardly increasing width and carrying the cutting edges of the blade, the masses of said enlargements providing for greater momentum of the blade and for increased cutting force thereof when said blade is rotated by said motor driven shaft.

3. The structure defined in claim 2, wherein the enlargement at the end of each of said arms is provided with inwardly converging edges forming a body similar to the frustum of a cone the small end of which merges with the corresponding arm of the blade.

4. The structure defined in claim 2, wherein the enlargement at the end of each of said arms is formed by a body which is appreciably wider than the corresponding arm from which it extends and forms thereat the outline of a body with outwardly flaring edges, each of said edges being beveled at an angle to the general plane of the body of the blade to form the cutting edges thereof.

5. In a rotary hedge trimmer of the class described, which includes a motor and a shaft driven thereby, a blade comprising a central mounting section for suitable attachment to said shaft and arms radially outwardly extending therefrom and carrying cutting edges at the outer ends thereof, a guide plate of generally circular outline carrying peripherally disposed projections extending therefrom at circumferentially spaced intervals, each of said projections having an inwardly directed substantially straight edge forming an acute angle with the center line through the axis of the guide plate, the straight edge of each of the projections of the guide plate coacting with the cutting edges of the blade attached to said motor driven shaft for the purpose of forming an acute angle therewith.

6. In a rotary hedge trimmer of the class described, which includes a motor and a shaft driven thereby, a blade comprising a central mounting section for suitable attachment to said shaft and arms radially outwardly extending therefrom and carrying cutting edges at the outer ends thereof, a guide plate of generally circular outline carrying peripherally disposed projections extending therefrom at circumferentially spaced intervals, each of said projections having an inwardly directed substantially straight edge forming an acute angle with the center line through the axis of the guide plate, the straight edge of each of the projections of the guide plate coacting with the cutting edges of the blade attached to said motor driven shaft for the purpose of forming an acute angle therewith, whereby objects to be trimmed including leaves, twigs, shrubbery and the like are drawn inwardly and nestle within the circumferential spaces between said projections incident to approach of the cutting edges of the blade responsive to rotation thereof.

7. The structure defined in claim 5, wherein the blade is provided with an enlargement at the outer end of each of the radially projecting arms thereof, said enlargements carrying the cutting edges, the masses of such enlargements imparting to the blade a greater momentum to increase the cutting force of said cutting edges responsive to the rotation of said blade.

HENRY C. DREISCHERF.

REFERENCES CITED

The following references are of record in the file of this patent:

UNITED STATES PATENTS

| Number | Name | Date |
|---|---|---|
| 2,153,771 | Orr | Apr. 11, 1939 |
| 1,414,239 | Warren | Apr. 25, 1922 |
| 1,608,031 | Poglein | Nov. 23, 1926 |
| 1,840,749 | Stresan | Jan. 12, 1932 |
| 2,278,922 | Goodall | Apr. 7, 1942 |